Nov. 17, 1925.

J. C. HULL 1,561,646

SPRAYING DEVICE

Filed Dec. 18, 1919

INVENTOR
John C. Hull
BY
ATTORNEY.

Patented Nov. 17, 1925.

1,561,646

UNITED STATES PATENT OFFICE.

JOHN C. HULL, OF GASPORT, NEW YORK.

SPRAYING DEVICE.

Application filed December 18, 1919. Serial No. 345,715.

*To all whom it may concern:*

Be it known that I, JOHN C. HULL, a citizen of the United States of America, residing at Gasport, county of Niagara and State of New York, have invented certain new and useful Improvements in Spraying Devices, of which the following is a full, clear, and exact description.

In my invention, I have produced a device which has its control and shut-off valve at the nozzle, whereby the pressure of the fluid will be maintained substantially constant up to the point of discharge, and no fluid will be wasted when the valve is shut off.

The shut-off valve of my device is operated by a slight rotary motion of a valve rod, and is provided with a rubber tip, which not only crushes any sediment which may accumulate in the discharge opening, but is not affected by the caustic solutions or the grit in the sediment of such solutions as is the case where metal valves are used.

By means of the invention hereinafter described, a very much shorter conducting tube can be used than is possible with the present construction, which results in saving much material, and provides a lighter and more easily handled device.

The above objects and advantages have been accomplished by the device shown in the accompanying drawings, of which:

Figure 1:
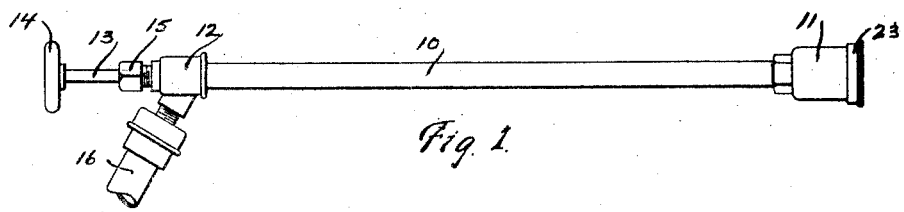
Fig. 1 shows an exterior view of my complete device.

In the drawings, 10 represents the conducting-tube of my device, which has the spray nozzle 11 with its controlling valve arranged at one end thereof and the hose-connector fitting 12 at the opposite end. 13 is the valve rod, and 14 a hand wheel for controlling the valve. The valve rod is suitably packed, by means of the packing gland 15, and it passes upwardly through the center of the conducting-tube 10. 16 is the hose, or other flexible conducting-tube which is fastened to the hose-connector fitting 12 in the usual manner. The angle at which the fitting is connected with the conducting-tube is such that the hose 16 will not be kinked when the device is in use and the flow of the fluid into the conducting tube will not be impeded.

17 is the nozzle body, which is preferably screw-threaded to the upper end of the conducting-tube 10. 18 is the nozzle disc, arranged at the upper end of the nozzle body 17, and having a central discharge opening 19. Between the nozzle body and the nozzle disc 18 is disposed a gasket 20, whereby an eddy chamber 21 is provided between the nozzle disc and the valve 22. The nozzle disc and gasket 20 are held in place by means of a nozzle cap 23, screw-threaded to the upper end of the nozzle body 17.

Figure 2:
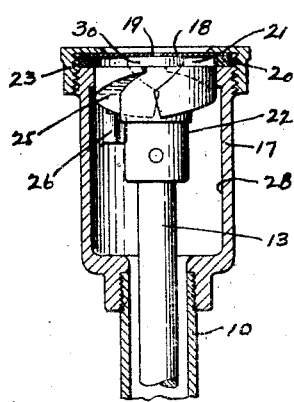
Fig. 2 is an enlarged, sectional view of the spray nozzle in its closed position.
Figure 3:
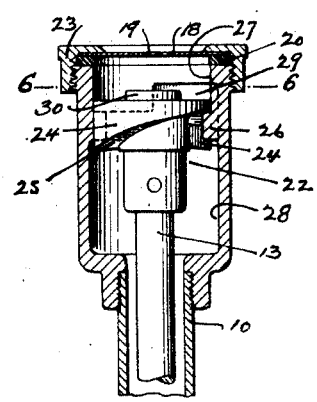
Fig. 3 is a similar view of the nozzle in its open position.
Figure 4:
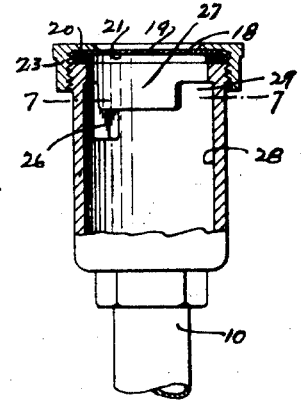
Fig. 4 is an enlarged, fragmentary, sectional view of the nozzle body, with the valve removed.
Figure 5:
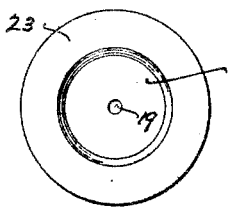
Fig. 5 is an enlarged, plan view of the nozzle.
Figure 6:
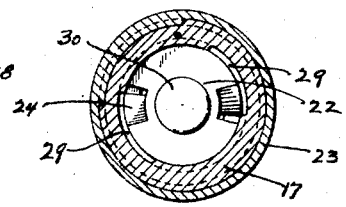
Fig. 6 is a transverse, sectional view of the same taken on line 6—6 of Fig. 3.
Figure 7:
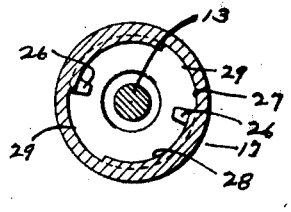
Fig. 7 is a similar view taken on line 7—7 of Fig. 4.

The valve 22 is provided with two diametrically opposite cams 24, each having a cam face 25 which is engagable with a cam lug 26. By means of the cam faces spiral passageways are provided through the valve from the pressure chamber, formed within the cored portion 28 of the body, to the eddy chamber 21. These lugs 26, which are carried by the cam body 17, are arranged diametrically opposite each other, and provide for the longitudinal motion of the valve as it is rotated upon its axis. The upper end of the nozzle body is provided with a bored portion 27 which fits the exterior diameter of the valve 22. The lower part of the body is, however, provided with a cored portion 28 of a diameter slightly larger than the bored portion 27, whereby a pressure chamber is formed. It will be seen that the cored portion 28 extends up into the bored portion 27 at two diametrically opposite places, providing auxiliary passageways 29. These parts are so proportioned, that when the valve is in the position shown in Fig. 2, the auxiliary passageways 29 will be cut off. After a slight downward motion of the valve, the passageways 29 will be uncovered and the exposed areas thereof increased until the valve has reached its lowermost point, as shown in Fig. 3.

The valve 22 is carried at the upper end of the valve rod 13 and is rotated by this rod. In the upper end of the valve is disposed a valve plug 30, preferably of rubber, and engagable with the nozzle disc, to close the discharge orifice 19, when the valve is in its uppermost position.

When the valve is in the position shown in Fig. 2 and is slightly opened the fluid will pass upwardly from the pressure chamber of the nozzle body and, striking the cam faces 25 of the valve, will be given a rapid whirling action and projected into the eddy chamber 21 as it passes through the spiral passageways. From the eddy chamber it will pass through the discharge orifice 19 of the nozzle disc and be sprayed therefrom. When the valve is in this condition the spray will not be projected very far but will be very wide, its sides being at a very obtuse angle to each other. As the valve 22 is moved downwardly the angle of the spray will be decreased until the point is reached where the auxiliary passageways 29 are exposed, when a portion of the fluid will pass out through the discharge orifice without having to pass through the spiral passageways formed by the cam faces 25 of the valve. When the valve is in the position shown in Fig. 3 the spray will be projected at the maximum distance. It will be seen by reference to Fig. 2 that when the valve is in the position there shown the valve plug will be pressed in engagement with the under-surface of the nozzle disc and effectively close the discharge orifice.

Obviously, while I have shown lugs carried by the body for coaction with the spirally formed under surfaces of the cam valve for imparting axial movement to the valve, I may provide separate screw or cam means located at some other convenient point for imparting the same motion to the valve. These and other modifications of the details herein shown and described may be made without departing from the spirit of my invention or the scope of the appended claims; and I do not, therefore, wish to be limited to the exact embodiment herein shown and described, the form hereinbefore described being merely a preferred embodiment thereof.

Having thus described my invention, what I claim is:

1. A spray nozzle comprising a body formed with a pressure chamber, a perforated nozzle disc carried by the body, a valve located at the upper end of the pressure chamber and slidable therein for controlling the fluid discharge, said valve being longitudinally movable within the body and having cam faces integrally formed thereon which provide spiral passageways, means coacting with the cam faces of the valve for moving the valve longitudinally within the body on rotation of said valve, and a valve plug carried by the valve and engageable with the disc.

2. A spray nozzle comprising a body formed with a pressure chamber, a perforated nozzle disc carried by the body, a valve located at the upper end of the pressure chamber, and slidable therein for controlling the fluid discharge, said valve being longitudinally movable within the body and having cam faces integrally formed thereon which provide spiral passageways, means coacting with the cam faces of the valve for moving the valve longitudinally within the body on rotation of said valve, a valve plug carried by the valve and engageable with the disc, and means located at the lower end of the tube for controlling the valve.

3. A spray nozzle comprising a body formed with a pressure chamber, a perforated nozzle disc carried by the body, cam lugs interiorly carried by the body, and a valve located at the upper end of the pressure chamber and slidable therein, said valve having cam faces integrally formed thereon which provide spiral passageways, such cam faces being engageable with the cam lugs, whereby, when the valve is rotated it is given longitudinal motion in the body.

4. A spray nozzle comprising a body formed with a pressure chamber, a perforated nozzle disc carried by the body, a valve located at the upper end of the pressure chamber and slidable therein, said valve being integrally formed with flat and spiral-shaped surfaces, whereby spiral passageways are formed, and means carried by the body co-acting with the spiral-shaped surfaces for imparting longitudinal motion to the valve when the valve is rotated.

5. A spray nozzle comprising a body formed with a pressure chamber, a perforated nozzle disc carried by the body, the body being formed with a plurality of auxiliary fluid passageways connected with the pressure chamber, a valve located at the upper end of the pressure chamber and slidable therein for controlling the fluid discharge and the auxiliary passageways, said valve being integrally formed with flat upper surfaces and spiral-shaped under surfaces, whereby spiral passageways are provided, a valve plug carried by the valve and projecting above the flat upper surfaces, and means carried by the body coacting with the spiral-shaped surfaces for imparting longitudinal motion to the valve when the valve is rotated.

6. A spray nozzle comprising a body formed with a pressure chamber, a perforated nozzle disc carried by the body, a valve located at the upper end of the pressure chamber and slidable therein, said valve having integrally formed thereon flat upper surfaces and spiral-shaped under surfaces whereby spiral passageways are provided, and lugs carried by the body for coaction with the spiral-shaped under surfaces of the valve for imparting longitudinal motion to the valve when the valve is rotated.

7. A spray nozzle comprising a body formed with a pressure chamber, a perforated nozzle disc carried by the body, a valve located at the upper end of the pressure chamber and slidable therein, said valve having integrally formed thereon flat upper surfaces and spiral-shaped under surfaces whereby spiral passageways are provided, a valve plug carried by the valve and projecting above the flat upper surfaces, and lugs carried by the body for coaction with the spiral-shaped under surfaces of the valve for imparting longitudinal motion to the valve when the valve is rotated.

In testimony whereof, I have hereunto signed my name.

JOHN C. HULL.